United States Patent
Liao (10) Patent No.: US 10,163,425 B2
(45) Date of Patent: Dec. 25, 2018

(54) CHUCK STRUCTURE CAPABLE OF QUICKLY ADJUSTING PLACEMENT ANGLE OF DRUMSTICK AND PERCUSSION PRACTICE ASSISTING DEVICE THEREOF

(71) Applicant: Tsun-Chi Liao, Taichung (TW)

(72) Inventor: Tsun-Chi Liao, Taichung (TW)

(*) Notice: Subject to any disclaimer, the term of this patent is extended or adjusted under 35 U.S.C. 154(b) by 0 days.

(21) Appl. No.: 14/692,074

(22) Filed: Apr. 21, 2015

(65) Prior Publication Data

US 2016/0314769 A1 Oct. 27, 2016

(51) Int. Cl.
*G10D 13/02* (2006.01)
*G10D 13/00* (2006.01)
*F16B 7/04* (2006.01)
*F16B 2/12* (2006.01)

(52) U.S. Cl.
CPC ......... *G10D 13/006* (2013.01); *F16B 7/0493* (2013.01); *F16B 2/12* (2013.01)

(58) Field of Classification Search
CPC ............................. G10D 13/006; F16B 7/0493
USPC ....................................................... 84/422.1
See application file for complete search history.

(56) References Cited

U.S. PATENT DOCUMENTS

| | | | | |
|---|---|---|---|---|
| 3,353,639 A | * | 11/1967 | Andrinssi | F16B 21/20 192/41 A |
| 5,297,467 A | * | 3/1994 | Hoshino | G10D 13/006 84/422.1 |
| 5,702,316 A | * | 12/1997 | Cole | F16H 55/30 474/95 |
| 5,961,122 A | * | 10/1999 | Marsi | F16J 15/3488 277/306 |
| 6,222,108 B1 | * | 4/2001 | Liao | G10D 13/006 84/422.1 |
| 7,956,268 B1 | * | 6/2011 | Liao | G10D 13/006 84/422.1 |

* cited by examiner

*Primary Examiner* — Jianchun Qin
(74) *Attorney, Agent, or Firm* — Muncy, Geissler, Olds & Lowe, P.C.

(57) ABSTRACT

A chuck structure for fixing a drumstick on a non-circular revolving shaft of a foot drum includes a retractable chuck, two arched plates and a fastening element. The two arched plates clamp the non-circular revolving shaft. An inner arched surface of each arched plate has an inner fastening surface correspondingly clamping the non-circular revolving shaft, and an outer arched surface of each arched plate has a spiked surface. The retractable chuck includes a fastening portion and a rotating portion, which are pivotally connected to each other, clamp the two arched plates, and are penetrated by the drumstick. Each of the fastening portion and a rotating portion has a clamping surface abutting against the spiked surface. The fastening member propels and rotates the rotating portion, so as to allow the retractable chuck, spaced by the two arched plates, to clamp and fasten on the non-circular revolving shaft.

10 Claims, 8 Drawing Sheets

CHUCK STRUCTURE CAPABLE OF QUICKLY ADJUSTING PLACEMENT ANGLE OF DRUMSTICK AND PERCUSSION PRACTICE ASSISTING DEVICE THEREOF

FIELD OF THE INVENTION

The present invention relates to a foot drum, and particularly to a chuck structure capable of quickly adjusting a placement angle of a drumstick.

BACKGROUND OF THE INVENTION

Figure 1:
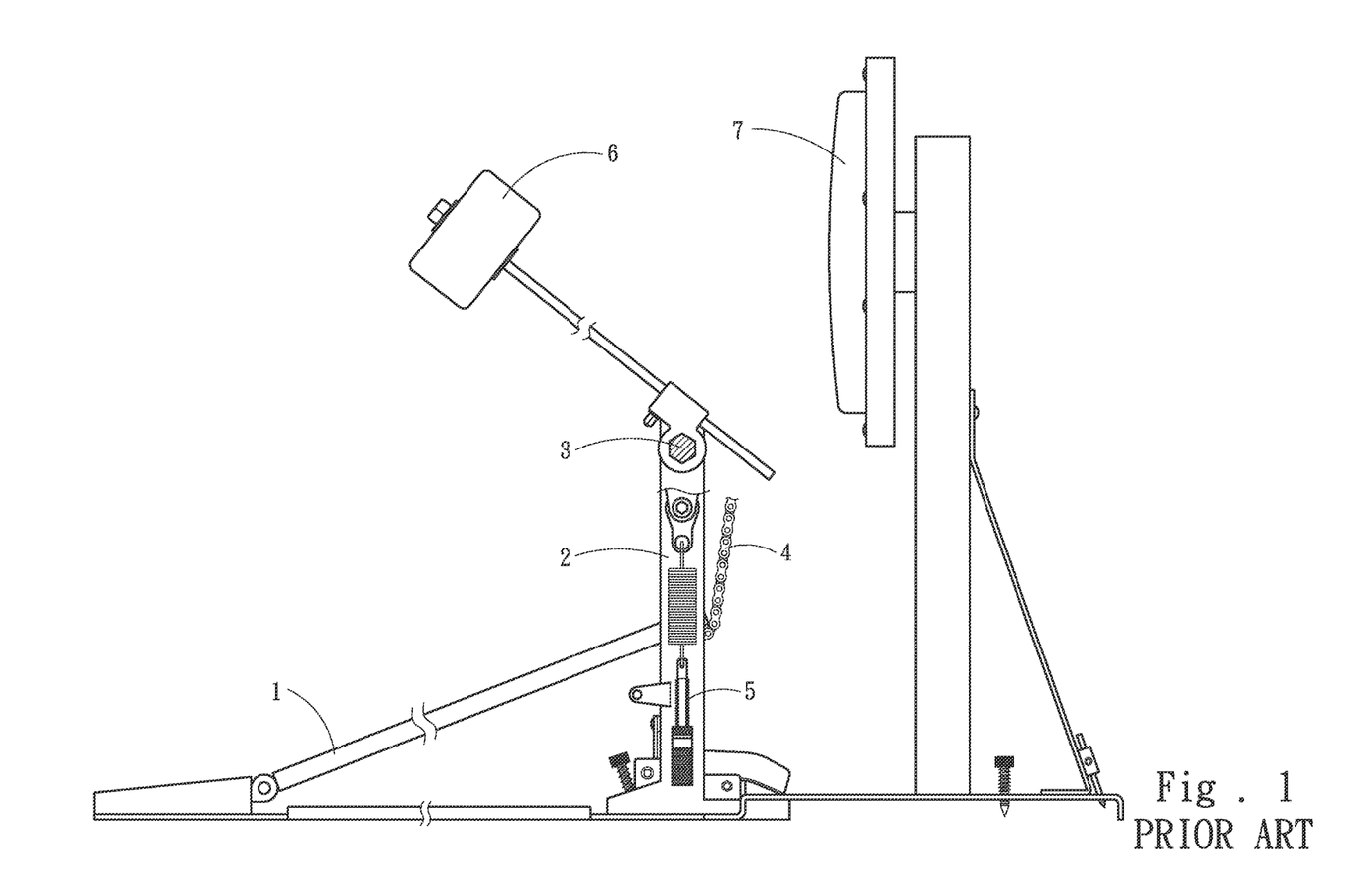
FIG. 1 is a schematic diagram of a structure of a conventional foot drum.
Figure 2:
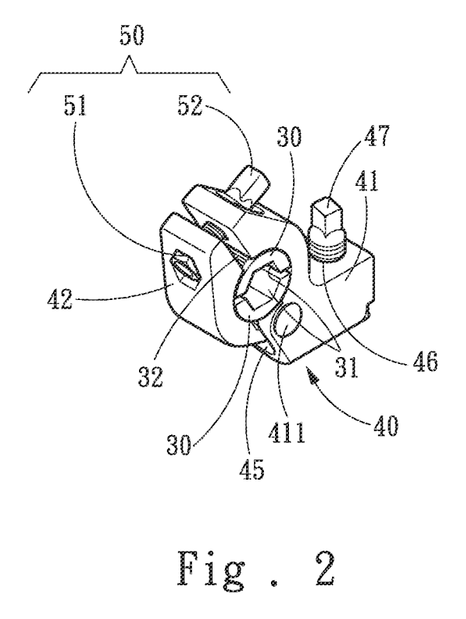
FIG. 2 is a structural diagram of an assembly of the present invention.
Figure 3:
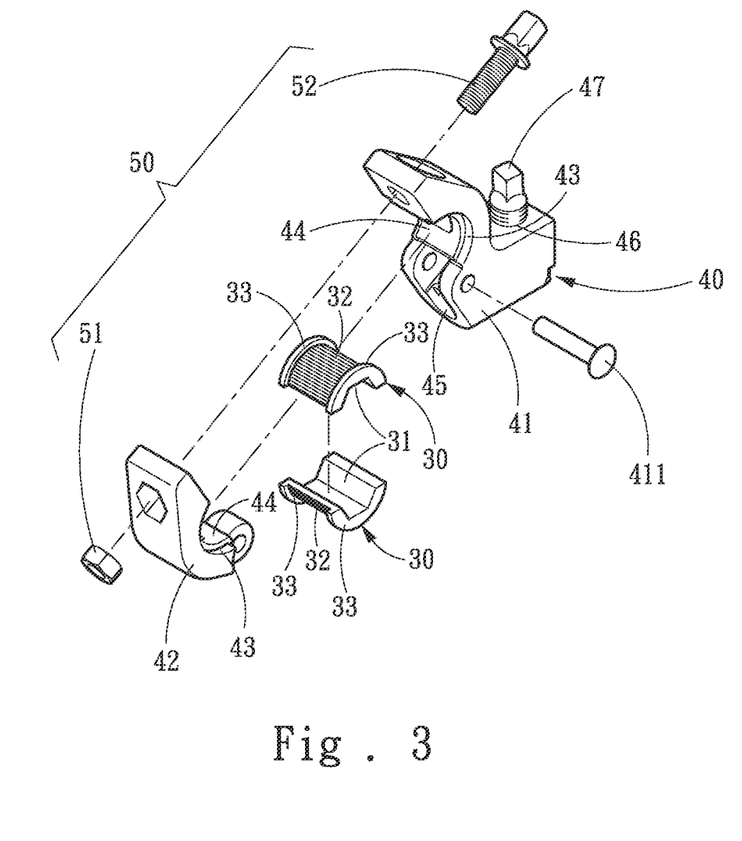
FIG. 3 is an exploded view of the present invention.
Figure 4:
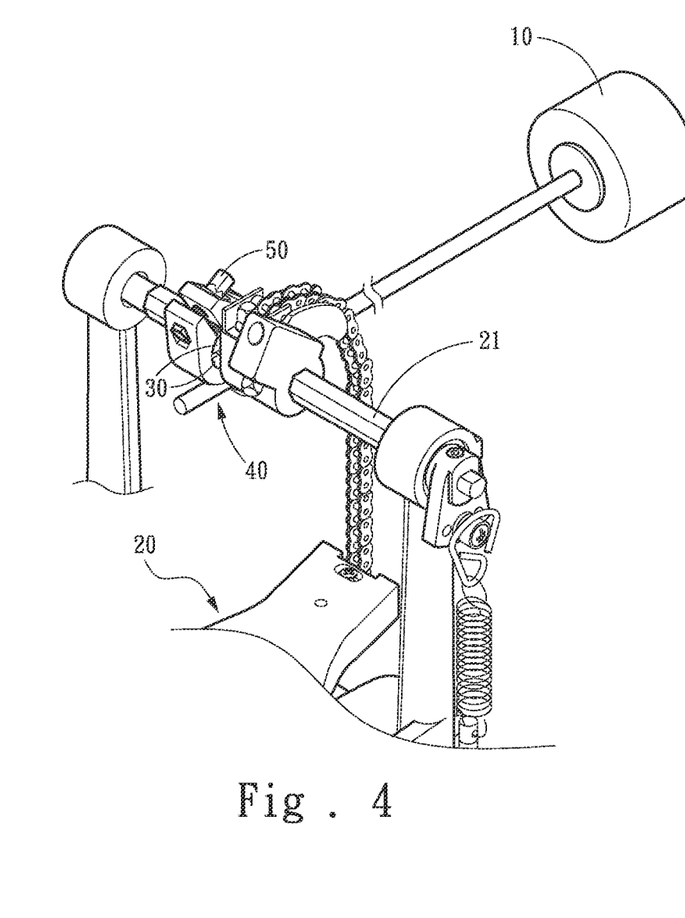
FIG. 4 is a partial diagram of a structure according to a first embodiment of the present invention.
Figure 5:
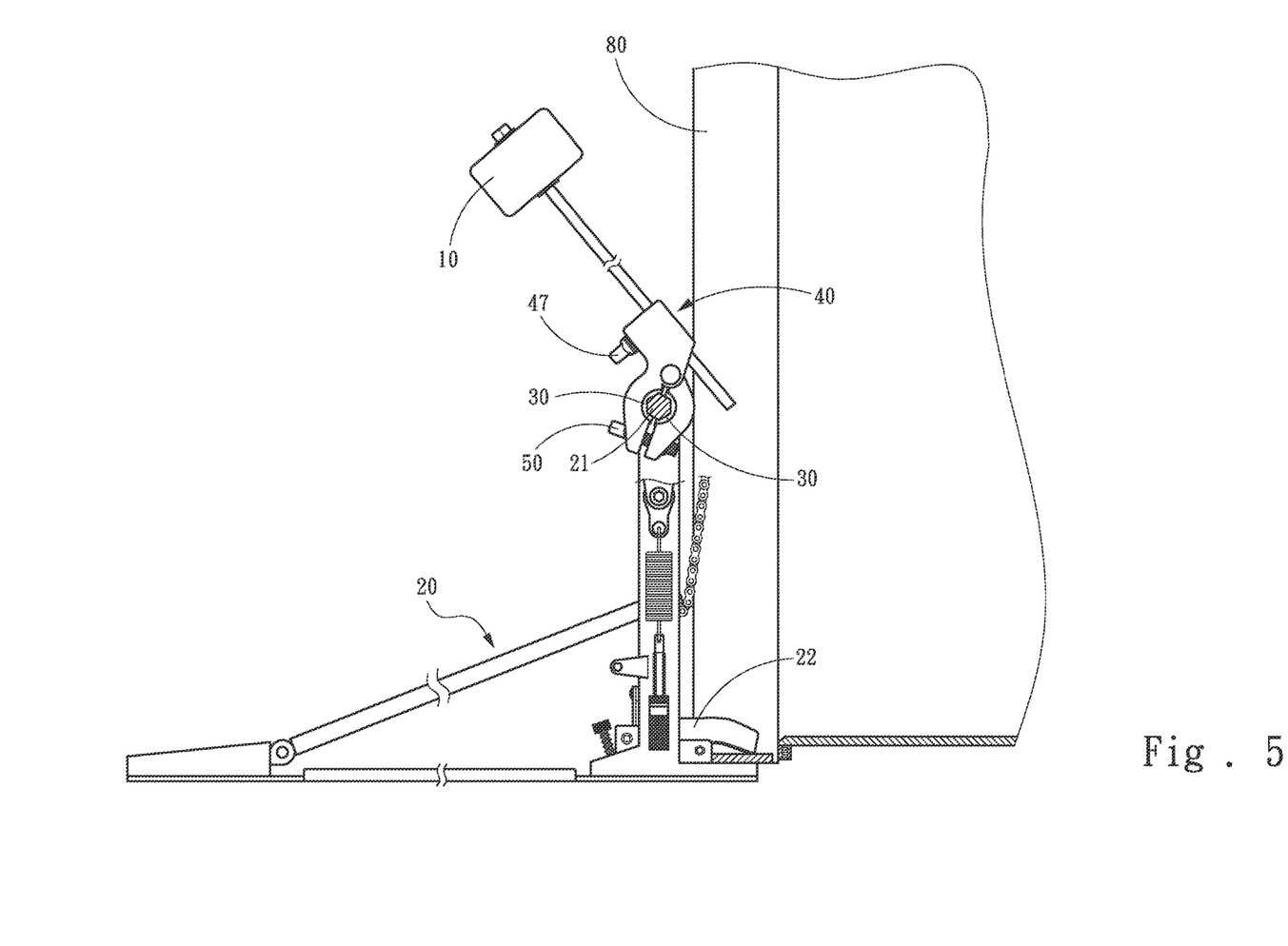
FIG. 5 is a side view of a structure according to the first embodiment of the present invention.

FIG. 1 shows a schematic diagram of a structure of a conventional foot drum utilized for practice. The conventional foot drum includes a pedal 1, a bracket 2, a non-circular revolving shaft 3, a chain 4, a reposition mechanism 5, a drumstick 6 and a practice drum 7. The non-circular revolving shaft 3 is mounted on the bracket 2. Through transmission of the non-circular revolving shaft 3, a user is required to only step on the pedal 1 to drive and rotate the non-circular revolving shaft 3 to further impel the drumstick 6 to hit the practice drum 7. Further, with the restoring force of the reposition mechanism 5, the drumstick 6 is driven back to an original position.

Only a dull sound is produced when the practice drum 7 is hit. Thus, during practice, no environmental noise is produce, so as to allow a user to freely practice at all times to satisfy user requirements.

The above conventional structure can be used by a user for practice purposes. For a user who wishes to practice in all occasions and at all times, in addition to the foot drum, the practice drum 7 also needs to be carried. However, carrying the practice drum 7 having a massive volume may result in considerable complications. It is apparent that the above conventional structure may fail to satisfy utilization requirements.

Further, in the above conventional foot drum, the drumstick 6 is fixed and accommodated on the non-circular revolving shaft 3, meaning that a relative angle between the drumstick 6 and the non-circular revolving shaft 3 is constant. When the relative angle between the drumstick 6 and the non-circular revolving shaft 3 needs to be changed, the bracket 2, the chain 4, the non-circular revolving shaft 3 and the reposition mechanism 5 need to be removed in order to disengage the drumstick 6. To successfully change the relative angle between the drumstick 6 and the non-circular revolving shaft 3, the drumstick 6 is then accommodated at a changed angle into the non-circular revolving shaft 3 and again assembled. In other words, tedious and complex disassembling and assembling processes need to be performed in order to change a placement position of the drumstick 6. Again, such method apparently fails to satisfy utilization needs.

SUMMARY OF THE INVENTION

It is a primary object of the present invention to disclose a chuck structure capable of quickly adjusting a placement angle of a drumstick, so as to quickly change a placement position of the drumstick to satisfy utilization requirements.

It is another object of the present invention to disclose a portable percussion practice assisting device having a small volume that can be applied with a foot drum to satisfy utilization requirements.

To achieve the above objects, the present invention provides a chuck structure capable of quickly adjusting a placement angle of a drumstick. The chuck structure is adapted to fix the drumstick on a non-circular revolving shaft of a foot drum, and includes two arched plates, a retractable chuck and a fastening element. The two arched plates clamp the non-circular revolving shaft. An inner arched surface of each of the two arched plates has an inner fastening surface for correspondingly fastening the non-circular revolving shaft. An outer arched surface of each of the two arched plates has a spiked surface.

The retractable chuck includes a fastening portion and a rotating portion pivotally connected to each other. The fastening portion and the rotating portion clamp the two arched plates. The fastening portion is penetrated by and fastens the drumstick. Each of the fastening portion and the rotating portion has a clamping surface for abutting against the spiked surface. The fastening element penetrates through the fastening portion and the rotating portion, and propels the rotating portion to rotate. Thus, the fastening portion and the rotating portion, spaced by the two arched plates, are allowed to clamp and fasten on the non-circular revolving shaft.

Accordingly, with the auxiliary effect of the two arched plates, the retractable chuck, spaced by the two arched plates, is allowed to clamp and fasten on the non-circular revolving shaft. Without disassembling the foot drum, the retractable chuck can clamp and fasten on the non-circular revolving shaft at any desired angle. In other words, according to actual requirements, the present invention is capable of quickly adjusting the placement angle of the drumstick to satisfy utilization requirements.

Further, the present invention may be applied with a percussion practice plate. The percussion practice plate is fixed on a fastening stand, which is further fixedly mounted on a drum frame clamping seat, and the percussion practice plate is placed facing outwards and slantingly close to the foot drum. By changing the placement angle of the drumstick to locate the percussion practice plate on the movement path of the drumstick, the present invention may serve for percussion practice use. Further, portability requirements can also be satisfied by the miniature form of the percussion practice plate.

DETAILED DESCRIPTION OF THE PREFERRED EMBODIMENTS

The foregoing, as well as additional objects, features and advantages of the invention will be more readily apparent from the following detailed description, which proceeds with reference to the accompanying drawings.

Referring to FIG. 2, FIG. 3, FIG. 4 and FIG. 5, the present invention provides a chuck structure capable of quickly adjusting a placement angle of a drumstick. The chuck structure of the present invention is applied to fix a drumstick 10 on a non-circular revolving shaft 21 of a foot drum 20, and includes two arched plates 30, a retractable chuck 40 and a fastening element 50. The two arched plates 30 clamp the non-circular revolving shaft 21. An inner arched surface of each of the two arched plates 30 has an inner fastening surface 31 correspondingly clamping the non-circular revolving shaft 21. The non-circular revolving shaft 21 may have a hexagonal planar contour, and the inner fastening surface 31 of each of the arched plates 30 may also have a corresponding hexagonal planar contour when assembled. An outer arched surface of each of the two arched plates 30 has a spiked surface 32, and each lateral end of the two arched plates 30 has a flange 33. The retractable chuck 40 includes a fastening portion 41 and a rotating portion 42 that are pivotally connected to each other. Each of the fastening portion 41 and the rotating portion 42 has an inner recess 43 corresponding to the flange 33, so as to enhance the binding stability among the two arched plates 30, the fastening portion 41 and the rotating portion 42.

The fastening portion 41 and the rotating portion 42 of the retractable chuck 40 are pivotally connected by a pivot 411, and jointly clamp the two arched plates 30. Further, the fastening portion 41 is penetrated by and fastens the drumstick 10. Each of the fastening portion 41 and the rotating portion 42 has a clamping surface 44 that abuts closely against the spiked surface 32. To secure the drumstick 10, the fastening portion 41 may include a fastening hole 45 that can be penetrated through by the drumstick 10 to secure the drumstick 10. Further, the fastening portion 41 includes a screw hole 46 laterally penetrated through the fastening hole 45. The screw hole 46 is for screwing a packing column 47 that packs against the drumstick 10.

The fastening element 50 penetrates through the fastening portion 41 and the rotating portion 42, and propels the rotating portion 52 to rotate. As such, the fastening portion 41 and the rotating portion 42, spaced by the two arched plates 30 from the non-circular revolving shaft 21, are allow to clamp and fasten on the non-circular revolving shaft 21. In practice, the fastening element 50 may include a screw nut 51 and a screw bolt 52. The screw bolt 52 penetrates through the fastening portion 41 and the rotating portion 52 to tighten the screw nut 51.

In the embodiment, the retractable chuck 40 is spaced by the two arched plates 30 to clamp and fasten on the non-circular revolving shaft 21. Thus, without disassembling the foot drum 20, the retractable chuck 40 may clamp and fasten on the non-circular revolving shaft 21 at any desired angle. That is, the present invention may be installed on the non-circular revolving shaft 21 of the foot drum 20, and can be applied to percuss a large floor-type drum 80 by changing only a placement position of the drumstick 10 without involving tedious and complex disassembling and assembling processes.

Figure 6:
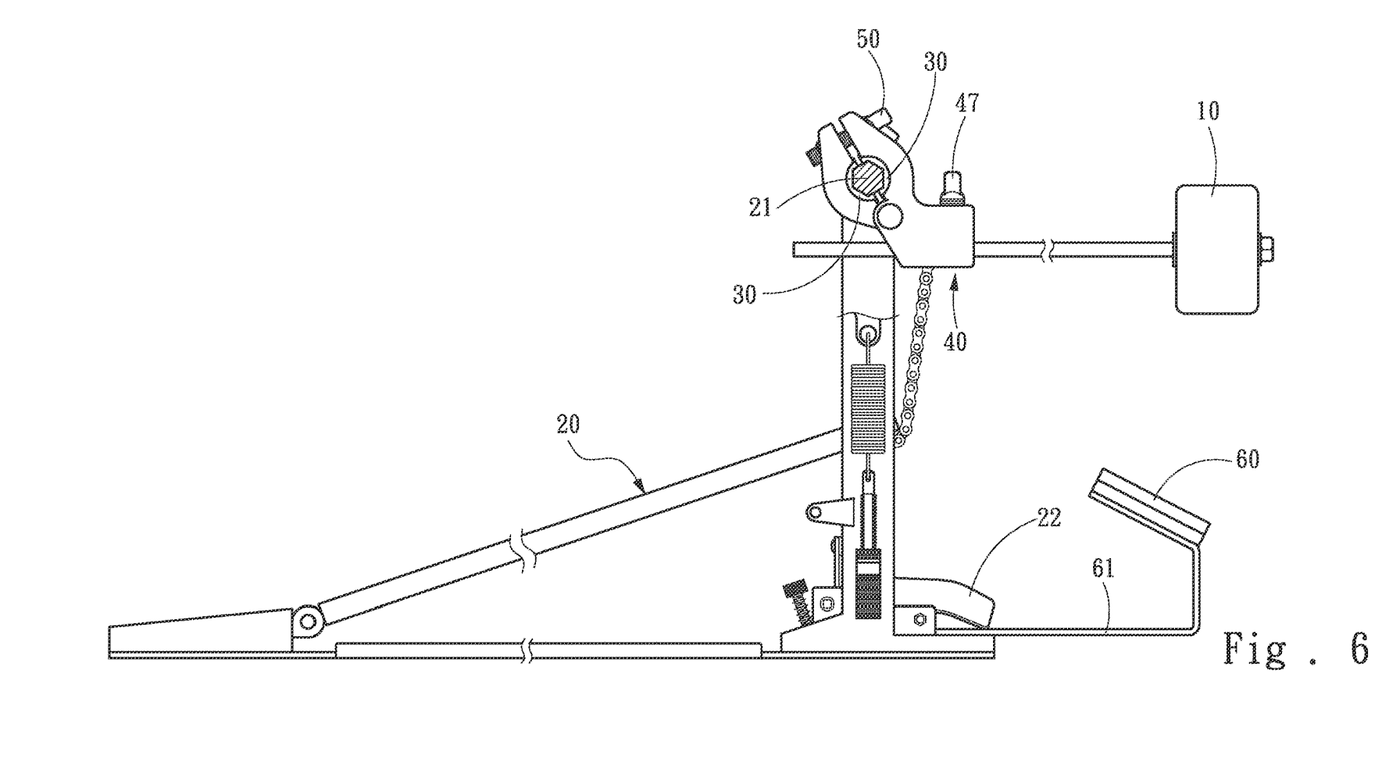
FIG. 6 is a structural diagram according to a second embodiment of the present invention.

FIG. 6 shows a second embodiment of the present invention. The present invention may also be applied with a percussion practice plate 60 to serve as a percussion practice assisting device.

In the embodiment, the percussion practice plate 60 is fixed on a fastening stand 61. The fastening stand 61 is fixedly mounted on a drum frame clamping seat 22. Further, the percussion practice plate 60 is placed facing outwards and slantingly close to the foot drum 20, and the placement angles of the drumstick 10 and the non-circular revolving shaft 21 render the percussion practice plate 60 to locate on a movement path of the drumstick 10.

As the percussion practice plate 60 is placed slantingly close to the foot drum 20, the percussion practice plate 60 can be secured without using a large stand. That is, the percussion practice plate 60 can be kept in a miniature form for easily portability to satisfy portability requirements. Thus, a user only needs to step on the foot drum 20 to drive and rotate the drumstick 10, which then hits the percussion practice plate 60 to satisfy requirements of percussion practice.

Figure 7:
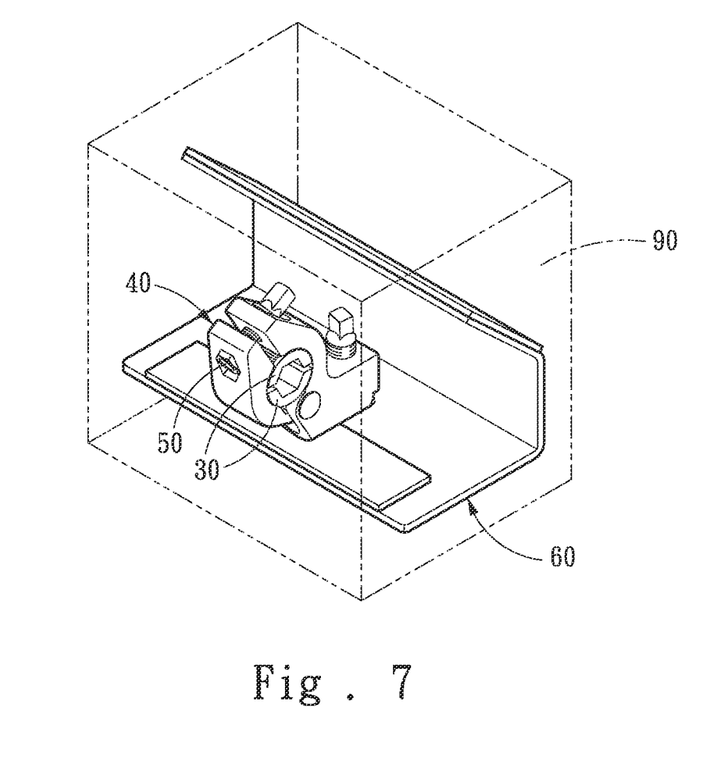
FIG. 7 is a schematic diagram of an accessory kit according to the second embodiment of the present invention.

Referring to FIG. 7, the two arched plates 30, the retractable chuck 40, the fastening element 50 and the percussion practice plate 60 may be packaged into one accessory kit 90, which may be independently sold. Given that a consumer already owns a conventional foot drum, the accessory kit 90 may be purchased, and the structure according to the second embodiment can be assembled at home to serve as a percussion practice assisting device.

Figure 8:
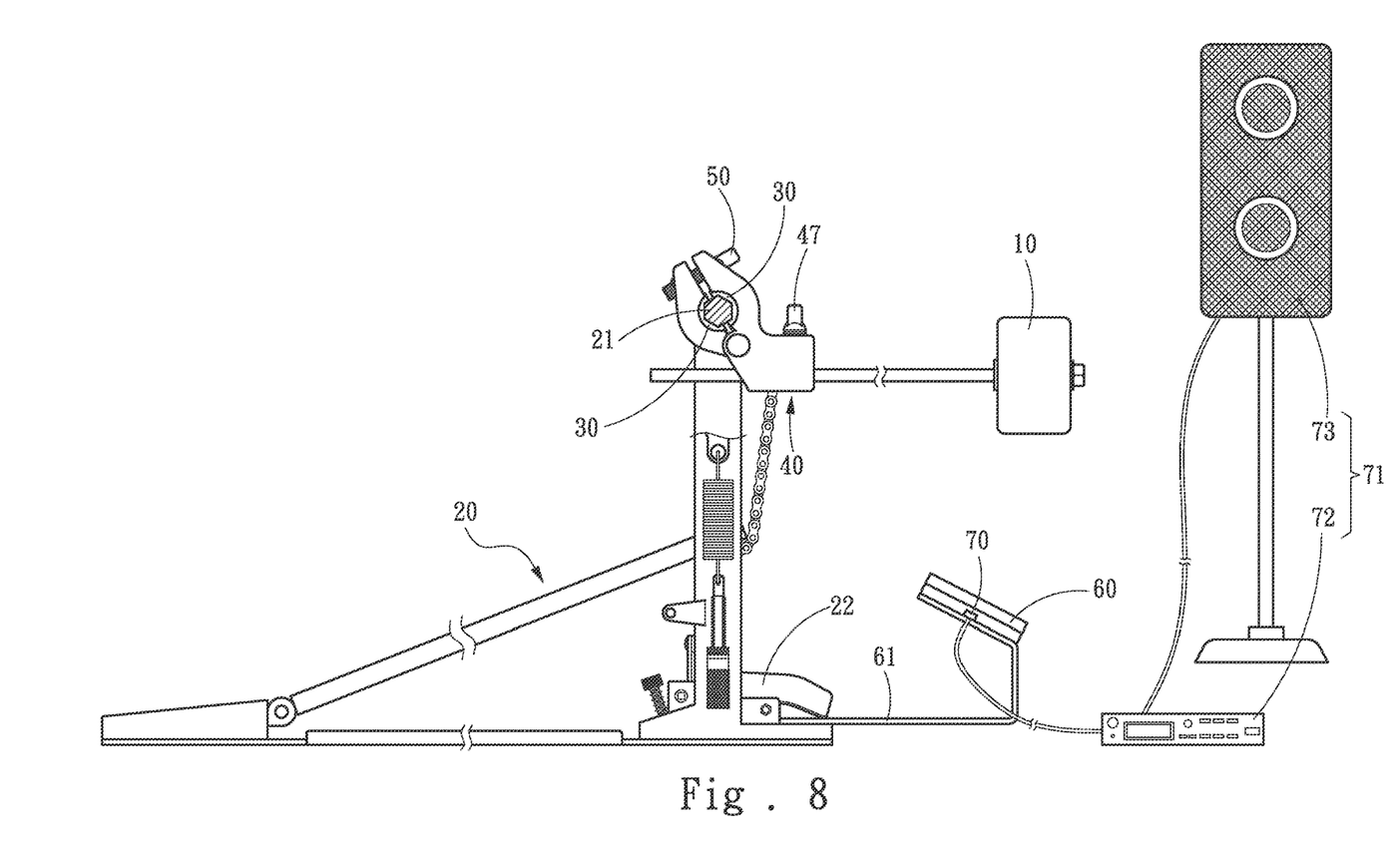
FIG. 8 is a structural diagram according to a third embodiment of the present invention.

FIG. 8 shows a third embodiment of the present invention. In the embodiment, the percussion practice plate 60 may be further provided with a sensing element 70. The sensing element 70 is connected to an electronic drum 71, which may include an amplifier 72 and an acoustic device 73. A signal received by the sensing element 70 is processed and amplified by the amplifier 72, and electronic sounds are then generated by the acoustic device 73 to form the electronic drum 71.

In conclusion, in the present invention, with the auxiliary effects provided by the two arched plates, the retractable chuck, spaced by the two arched plates, is allowed to clamp and fasten on the non-circular revolving shaft, so that the retractable chuck may clamp and fasten on the non-circular revolving shaft at any desired angle. Thus, according to actual requirements, the present invention is capable of quickly adjusting a placement angle of the drumstick to solve complications of a dissembling process of a conventional foot drum. Further, when the present invention is applied with a percussion practice plate, by changing the placement angle of the drumstick to render the percussion practice plate to locate on the movement path of the drumstick, the present invention may serve for percussion practice uses. Further, portability requirements can be satisfied by the miniature form of the percussion practice plate. Moreover, by providing the percussion practice plate with a sensing element to form an electronic drum, utilization requirements are further satisfied.

What is claimed is:

1. A foot drum, comprising:
  a frame comprising a non-circular revolving shaft;
  a pedal;
  a chain holder fixing on the non-circular revolving shaft;
  a chain, one side of the chain mounting on the pedal and the other side of the chain mounting on the chair holder, wherein the chain promotes the chair holder and the non-circular revolving shaft rotates when the pedal is stamped; and
  a drumstick clamp for a drumstick mounted on, which is setting on the non-circular revolving shaft, comprising two arched plates, a retractable chuck and a fastening element, an inner arched surface of each of the two arched plates having an inner fastening surface corresponding to the shape of the non-circular revolving shaft, an outer arched surface of each of the two arched plates having a spiked surface; the retractable chuck comprising a fastening portion, and a pivot penetrating the fastening portion and the rotating portion so that the fastening portion and the rotating portion are pivotally connected to each other, the fastening portion and the rotating portion limiting the movement of the two arched plates, the fastening portion being penetrated by and fastening the drumstick, each of the fastening portion and the rotating portion having a clamping surface that abuts closely against the spiked surface; wherein the fastening element is penetrated through the fastening portion and the rotating portion, propelling the rotating portion to rotate towards the direction of the fastening portion, so as to fasten the two arched plates, which are located between the fastening portion and the rotating portion, on the non-circular revolving shaft, wherein each of the two arched plates includes two distal ends and is disposed on the non-circular revolving shaft, the two distal ends of one of the two arched plates correspond to the two distal ends of another of the two arched plates to form two gaps between the two arched plates when the two arched plates are fastened within the fastening portion and the rotating portion on the non-circular revolving shaft.

2. The chuck structure capable of quickly adjusting a placement angle of a drumstick of claim 1, wherein each lateral end of the two arched plates has a flange, and each of the fastening portion and the rotating portion has an inner recess corresponding to the flange.

3. The chuck structure capable of quickly adjusting a placement angle of a drumstick of claim 1, wherein the non-circular revolving shaft has a hexagonal planar contour.

4. The chuck structure capable of quickly adjusting a placement angle of a drumstick of claim 1, wherein the fastening element comprises a screw nut and a screw bolt, and the screw bolt penetrates through the fastening portion and the rotating portion to tighten the screw nut.

5. The chuck structure capable of quickly adjusting a placement angle of a drumstick of claim 1, wherein the fastening portion comprises a fastening hole to be penetrated by and for securing the drumstick, and further comprises a screw hole that laterally penetrates through the fastening hole; the screw hole is for screwing a packing column that packs against the drumstick.

6. A percussion practice assisting device comprising:
 a foot drum, comprising:
  a frame including a non-circular revolving shaft;
  a pedal;
  a chain holder, fixing on the non-circular revolving shaft;
  a chain, one side of the chain mounting on the pedal and the other side of the chain mounting on the chain holder, wherein the chain promotes the chain holder and the non-circular revolving shaft rotates when the pedal is stamped; and
  a drumstick clamp for a drumstick mounted on, which is setting on the non-circular revolving shaft, comprising two arched plates, a retractable chuck and a fastening element, an inner arched surface of each of the two arched plates having an inner fastening surface corresponding to the shape of the non-circular revolving shaft, an outer arched surface of each of the two arched plates having a spiked surface; the retractable chuck comprising a fastening portion, a rotating portion, and a pivot penetrating the fastening portion and the rotating portion so that the fastening portion and the rotating portion are pivotally connected to each other, the fastening portion and the rotating portion limiting the movement of the two arched plates, each of the fastening portion and the rotating portion having a clamping surface that abuts closely against the spiked surface, the drumstick penetrating through and fastened on the fastening portion; wherein the fastening element is penetrated through the fastening portion and the rotating portion, propelling the rotating portion to rotate towards the direction of the fastening portion, so as to fasten the two arched plates, which are located between the fastening portion and the rotating portion, on the non-circular revolving shaft; and
 a percussion practice plate, fixed on a fastening stand, the fastening stand fixedly mounted on a drum frame clamping seat, the percussion practice plate being placed facing outwards and slantingly close to the foot drum, placement angles of the drumstick and the non-circular revolving shaft rendering the percussion practice plate to locate on a movement path of the drumstick
  wherein each of the two arched plates includes two distal ends and is disposed on the non-circular revolving shaft, the two distal ends of one of the two arched plates correspond to the two distal ends of another of the two arched plates to form two gaps between the two arched plates when the two arched plates are fastened within the fastening portion and the rotating portion on the non-circular revolving shaft.

7. The percussion practice assisting device of claim 6, wherein the percussion practice plate is provided with a sensing element that is connected to an electronic drum.

8. The percussion practice assisting device of claim 6, wherein each lateral end of the two arched plates has a flange, and each of the fastening portion and the rotating portion has an inner recess corresponding to the flange.

9. The percussion practice assisting device of claim 6, wherein the fastening element comprises a screw nut and a screw bolt, and the screw bolt penetrates through the fastening portion and the rotating portion to tighten the screw nut.

10. The percussion practice assisting device of claim 6, wherein the fastening portion comprises a fastening hole to be penetrated by and for securing the drumstick, and further comprises a screw hole that laterally penetrates through the fastening hole; the screw hole is for screwing a packing column that packs against the drumstick.

* * * * *